(12) United States Patent
Shay et al.

(10) Patent No.: US 10,740,790 B2
(45) Date of Patent: Aug. 11, 2020

(54) PREDICTING USER INTERACTIONS WITH OBJECTS ASSOCIATED WITH ADVERTISEMENTS ON AN ONLINE SYSTEM

(71) Applicant: Facebook, Inc., Menlo Park, CA (US)

(72) Inventors: Eitan Shay, Palo Alto, CA (US); Stuart Michael Bowers, Menlo Park, CA (US); Richard Bill Sim, Belmont, CA (US); Jun Yang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 805 days.

(21) Appl. No.: 14/332,167

(22) Filed: Jul. 15, 2014

(65) Prior Publication Data

US 2015/0088639 A1    Mar. 26, 2015

Related U.S. Application Data (63) Continuation of application No. 14/034,338, filed on Sep. 23, 2013, now abandoned.

(51) Int. Cl.
*G06Q 30/00* (2012.01)
*G06Q 30/02* (2012.01)

(52) U.S. Cl.
CPC .................. *G06Q 30/0254* (2013.01)

(58) Field of Classification Search
CPC .... G06Q 30/02; G06Q 30/08; G06Q 30/0241; G06Q 30/06; G06Q 30/0201; G06Q 30/0207; G06Q 50/01
See application file for complete search history.

(56) References Cited

U.S. PATENT DOCUMENTS

| 8,175,914 B1 | 5/2012 | Benson et al. |
| 8,380,175 B2 * | 2/2013 | Rao ........................ G06Q 30/02 455/2.01 |

(Continued)

FOREIGN PATENT DOCUMENTS

| JP | 2009-522603 A | 6/2009 |
| JP | 2013-519717 A | 5/2013 |
| WO | WO 2011/097624 A2 | 8/2011 |

OTHER PUBLICATIONS

Top Community Discussions About Facebook, Aug. 23, 2012, www.macupdate.com (Year: 2012).*

(Continued)

*Primary Examiner* — Naresh Vig
(74) *Attorney, Agent, or Firm* — Fenwick & West LLP (57) ABSTRACT

Based on prior interactions associated with a user, an online system predicts an amount of interaction by the user with an object associated with an advertisement. Using the predicted amount of user interaction, the online system determines an expected value of presenting the advertisement to the user. The advertisement is ranked among other advertisements based on the expected values associated with the advertisements, and one or more advertisements are selected for presentation to the user based on the ranking. An advertisement may also specify a threshold amount of interaction with an associated object as targeting criteria, so the predicted amount of interaction with the object associated with the advertisement may determine if a user is eligible to be presented with the advertisement.

20 Claims, 3 Drawing Sheets

(56) References Cited

U.S. PATENT DOCUMENTS

| | | | |
|---|---|---|---|
| 8,930,238 B2 * | 1/2015 | Coffman | G06Q 30/02 705/14.58 |
| 2005/0021397 A1 | 1/2005 | Cui et al. | |
| 2006/0294084 A1 | 12/2006 | Patel et al. | |
| 2007/0156887 A1 | 7/2007 | Wright et al. | |
| 2007/0157228 A1 | 7/2007 | Bayer et al. | |
| 2007/0260596 A1 | 11/2007 | Koran et al. | |
| 2008/0262929 A1 * | 10/2008 | Behr | G06Q 30/02 705/14.41 |
| 2009/0017805 A1 | 1/2009 | Sarukkai et al. | |
| 2009/0018920 A1 * | 1/2009 | Lerman | G06Q 30/00 705/14.66 |
| 2009/0070219 A1 | 3/2009 | D'Angelo et al. | |
| 2011/0055003 A1 | 3/2011 | Wang et al. | |
| 2011/0066506 A1 | 3/2011 | Sung et al. | |
| 2011/0166932 A1 * | 7/2011 | Smith | G06Q 30/02 705/14.53 |
| 2012/0084155 A1 * | 4/2012 | Roy | G06Q 30/0273 705/14.69 |
| 2012/0158499 A1 | 6/2012 | Banadaki et al. | |
| 2012/0166285 A1 | 6/2012 | Shapiro | |
| 2012/0166433 A1 * | 6/2012 | Tseng | H04W 4/21 707/728 |
| 2012/0166532 A1 | 6/2012 | Juan et al. | |
| 2012/0191560 A1 | 7/2012 | Sengupta et al. | |
| 2012/0232985 A1 * | 9/2012 | Lasker | G06Q 30/02 705/14.41 |
| 2012/0244948 A1 | 9/2012 | Dhillon et al. | |
| 2012/0284128 A1 | 11/2012 | Wang et al. | |
| 2012/0310729 A1 | 12/2012 | Dalto et al. | |
| 2013/0055097 A1 | 2/2013 | Soroca et al. | |
| 2013/0073473 A1 * | 3/2013 | Heath | G06Q 30/02 705/319 |
| 2013/0124297 A1 | 5/2013 | Hegeman et al. | |
| 2013/0124331 A1 | 5/2013 | Doughty et al. | |
| 2013/0159110 A1 | 6/2013 | Rajaram et al. | |
| 2013/0231999 A1 | 9/2013 | Emrich et al. | |
| 2014/0095324 A1 | 4/2014 | Cabral et al. | |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |
| 2014/0344057 A1 * | 11/2014 | Massoudi | G06Q 30/0257 705/14.58 |
| 2014/0379482 A1 | 12/2014 | Demsey | |
| 2015/0046467 A1 | 2/2015 | Hummel et al. | |

OTHER PUBLICATIONS

PCT International Search Report and Opinion, PCT Application No. PCT/US2014/052155, dated Nov. 26, 2014, thirteen pages.

United States Office Action, U.S. Appl. No. 14/034,338, dated Apr. 8, 2016, thirty-six pages.

Canadian Intellectual Property Office, Office Action, Canadian Patent Application No. 2,920,741, dated Nov. 23, 2016, three pages.

United States Office Action, U.S. Appl. No. 14/034,338, dated Aug. 14, 2015, thirty-four pages.

Canadian Intellectual Property Office, Office Action, Canadian Patent Application No. 2,920,741, dated Nov. 8, 2017, five pages.

Japan Patent Office, Office Action, Japanese Patent Application No. 2016-544336, dated May 8, 2018, six pages.

Kon-No, S. et al., "A Wonder Technique to Master AdWords—The Newest Approach!," *SEO SEM Technique*, Jul. 2, 2007, pp. 64-68, vol. 2, Shoeisha Co., Ltd., Japan [with summary in English].

United States Patent Office, Office Action, U.S. Appl. No. 14/034,338, dated May 4, 2018, thirty-one pages.

United States Patent Office, Office Action, U.S. Appl. No. 14/034,338, dated Nov. 29, 2018, thirty-four pages.

United States Patent Office, Office Action, U.S. Appl. No. 14/034,338, dated May 13, 2019, twenty-nine pages.

United States Office Action, U.S. Appl. No. 14/034,338, dated Jul. 13, 2017, twenty-nine pages.

\* cited by examiner

PREDICTING USER INTERACTIONS WITH OBJECTS ASSOCIATED WITH ADVERTISEMENTS ON AN ONLINE SYSTEM

CROSS REFERENCE TO RELATED APPLICATIONS

This application is a continuation of U.S. application Ser. No. 14/034,338, filed Sep. 23, 2013, which is incorporated by reference in its entirety.

BACKGROUND

This invention relates generally to online systems, and in particular to presenting advertisements on an online system.

Presenting advertisements to users of an online system allows an advertiser to gain public attention for products or services and to persuade online system users to take an action regarding the advertiser's products, services, opinions, or causes. Conventional online systems select and present an advertisement to a user satisfying one or more targeting criteria associated with the advertisement; the online system then charges an advertiser associated with the presented advertisement based on a bid amount associated with the advertisement and provided by the advertiser. For example, an advertisement having a highest bid amount from a group of advertisements eligible for presentation to a user satisfying one or more targeting criteria associated with the advertisement is selected, and the advertiser associated with the selected advertisement is charged an amount based on the bid amounts of other advertisements eligible for presentation to the user.

Associating targeting criteria with advertisements allows advertisers to present advertisements to online system users having specific characteristics to increase the likelihood of users accessing advertisements or to expose specific users to advertisements. For example, targeting criteria identifies actions previously performed by a user to increase the likelihood of an advertisement associated with the targeting criteria being presented to a user likely to perform an action (e.g., install an application, make a purchase, etc.). As another example, targeting criteria identify demographic information of a user, so an advertisement associated with the targeting criteria is presented to online system users having particular demographic characteristics. While conventional targeting criteria may account for a likelihood of a user performing an action based on the advertisement, conventional targeting criteria does not account for the likelihood of a user performing subsequent actions with the content being advertised. For example, conventional targeting criteria does not account for an amount of money a user is likely to spend after installing an advertised application or accessing an advertised retailer, but merely accounts for the likelihood of the user installing the application or accessing the retailer.

SUMMARY

An online system derives revenue by displaying advertisements to its users and charging advertisers for this service. Advertisers are commonly charged an amount based on a bid submitted by advertisers for their advertising campaigns on the online system. An advertisement is selected for display to a user based on information including targeting criteria associated with the advertisement, display times associated with the advertisement, and privacy settings associated with the user. Targeting criteria may be based on information relating to whether a user is likely to perform an action associated with an advertisement, such as whether the user is likely to install an application, make a purchase from a retailer, etc.

To maximize revenue and enhance advertisement targeting, an online system predicts a likelihood that a user will perform particular actions (i.e., "ad action") associated with the content of an advertisement if the advertisement is served to the user. Thus, an ad action of an advertisement represents a predicted amount of interaction between a user presented with the advertisement and an object associated with an advertisement. For example, an ad action represents a predicted amount of money spent by a user in an application associated with an advertisement, a predicted amount of time a user spends interacting with content associated with an advertisement, a predicted number of times a user accesses content associated with an advertisement, or any other suitable action associated with advertisement content. An advertiser or the online system may specify an action or actions used to determining an ad action associated with an advertisement.

An ad action for presentation of an advertisement to a user is based on a likelihood that the user will perform an initial interaction with content associated with the advertisement request and a likelihood of the user performing additional interactions with the content associated with the advertisement given the initial interaction. The online system retrieves historical actions associated with a user and analyzes the user's historical actions along with the content associated with the advertisement to determine the likelihood of the user performing various interactions with the content associated with the advertisement. Information about a user's actions may be received from a tracking pixel, or other tracking mechanism, loaded when a user's interactions with content satisfy one or more criteria (e.g., when a threshold number of purchases are made, when a threshold amount is spent, when a threshold amount of time is spent accessing content, etc.) and stored by the online system.

Based on the ad action for presenting an advertisement to a user, the online system computes an expected value of the advertisement, which may be compared to expected values for other advertisements to select an advertisement for presentation to a user. In one embodiment, the online system computes an expected revenue of presenting an advertisement based on the likelihood of the user performing additional interactions with the content associated with the advertisement. For example, advertisements are ranked based on their associated expected values, and the ranking is used to select an advertisement for presentation. A confidence interval indicating the reliability of an ad action may also be determined and used to vary the amount that an advertiser is charged for presentation of an advertisement to a user. For example, an expected return on investment for presenting an advertisement is specified by an advertiser and modified based on the confidence interval for the ad action of the advertisement, with the modified expected return on investment used to determine the amount the advertiser is charged for presentation of the advertisement.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An online system derives revenue by displaying advertisements to its users. The online system may act as a publishing system by receiving advertisements from advertisers and providing the advertisements to users, or the online system may act as an advertisement network by receiving advertisements from advertisers and providing them to other publishing sites. Alternatively, the online system may perform advertisement pricing for third parties. Frequently, advertisers are charged an amount by an online system for the online system presenting advertisements associated with the advertisers. The amount an advertiser is charged may be based on bid amounts associated with advertisements by advertisers, which may be determined on a cost-per-impression, a cost-per-click basis, a flat rate basis, a percent of expected revenue from a conversion event, or any other suitable basis.

The online system predicts a likelihood that a user will perform particular actions (i.e., "ad action") associated with the content of an advertisement if the advertisement is served to the user. Thus, an ad action of an advertisement represents a predicted amount of interaction between a user presented with the advertisement and an object associated with an advertisement. In various embodiments, an ad action represents a predicted amount of money spent by a user in an application associated with an advertisement, a predicted amount of time a user spends interacting with content associated with an advertisement, a predicted number of times a user accesses content associated with an advertisement, or any other suitable action associated with advertisement content. An advertiser or the online system may specify an action or actions used to determining an ad action associated with an advertisement. For example, an ad action specifies a predicted total amount of money that a user will spend in an application identified by an advertisement presented to the user if the user installs the application after being presented with the advertisement. The ad action may be expressed relative to a threshold or as a numerical value. For example, the ad action indicates whether a user is likely to spend at least $10 or whether the user is likely to spend exactly $12 after installing an application associated with a presented advertisement.

To determine an ad action for presentation of an advertisement to a user, the online system retrieves historical actions associated with a user and analyzes the user's historical actions along with the content associated with the advertisement to determine the likelihood of the user performing various interactions with the content associated with the advertisement. Based on the ad action for presentation of an advertisement, the online system generates an expected value for the advertisement. Based on the expected values of various advertisements, the online system selects one or more advertisements for presentation to a user. For example, the online system ranks advertisements in a group of advertisements eligible for presentation to a user based on their expected values, and selects an advertisement for presentation to the user based on the ranking.

The online system may also use an ad action associated with an advertisement to improve targeting of advertisements to online system users. In one embodiment, the online system limits presentation of an advertisement to those users for which presentation of the advertisement results in at least a threshold ad action. For example, the online system limits presentation of an advertisement associated with a game to users that are predicted to spend at least $20 within the game associated with the advertisement. A confidence interval indicating the reliability of an ad action for presentation of an advertisement to a user may be determined and used to vary the amount charged to an advertiser for presentation of the advertisement to a user based on an expected return on investment specified by the advertiser.

System Architecture

Figure 1:
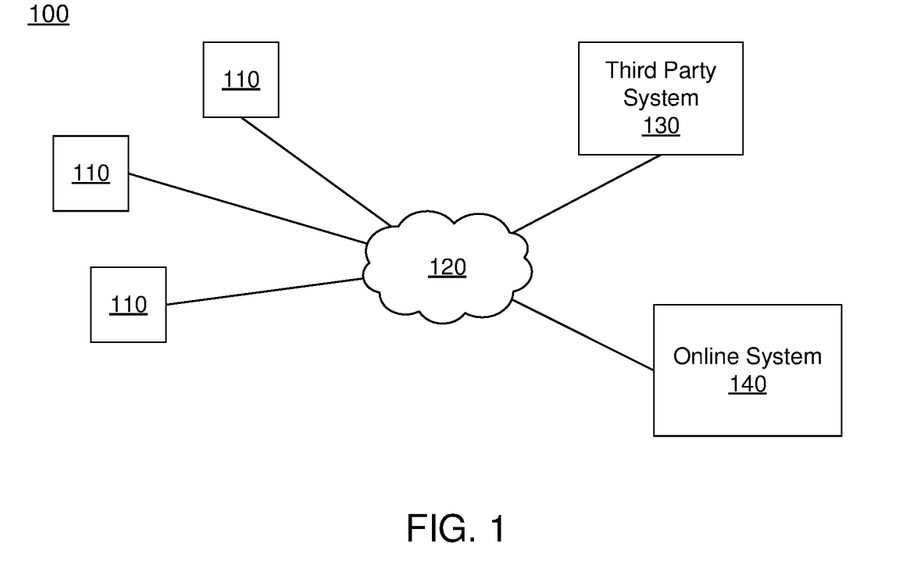
FIG. 1 is a block diagram of a system environment in which an online system operates, in accordance with an embodiment of the invention.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. For example, the online system 140 is a social networking system. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
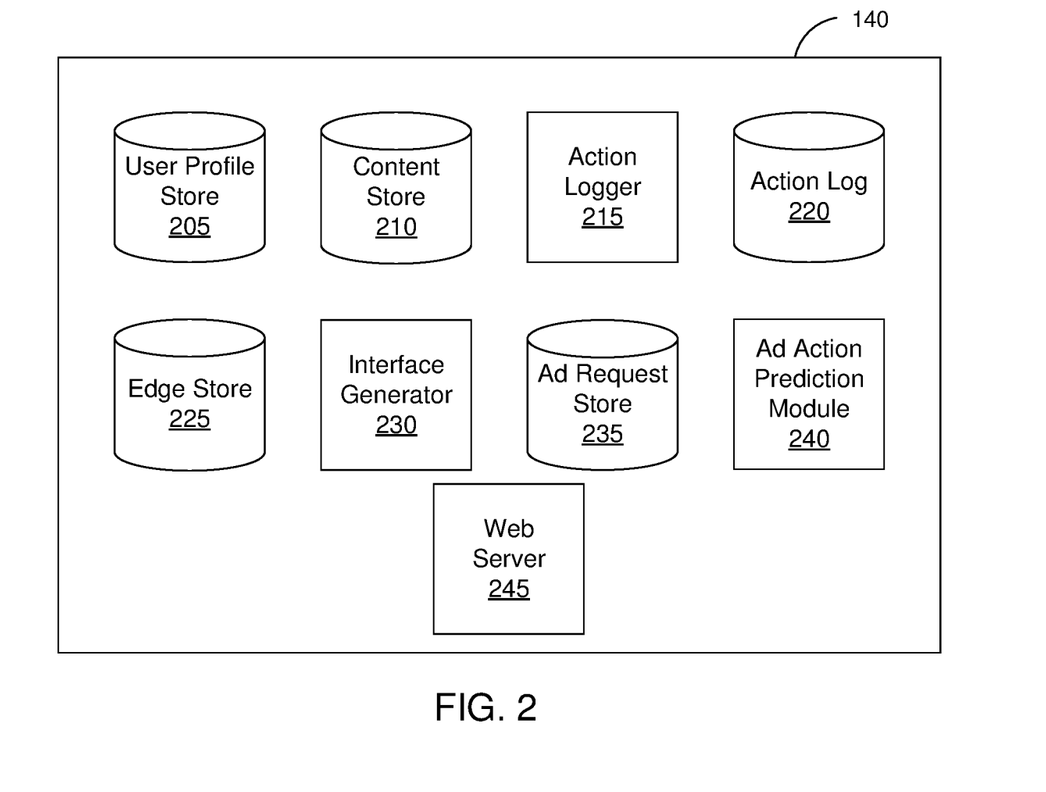
FIG. 2 is a block diagram of an online system, in accordance with an embodiment of the invention.

FIG. 2 is an example block diagram of an architecture of the online system 140. The online system 140 shown in FIG. 2 includes a user profile store 205, a content store 210, an action logger 215, an action log 220, an edge store 225, an interface generator 230, an ad request store 235, an ad action prediction module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The interface generator 230 generates one or more interfaces, such as web pages, including content from the online system 140. For example, interfaces generated by the interface generator 230 include images, video, profile information, or other data. The interface generator 230 also generates one or more interfaces allowing the online system 140 to request information from users and for users to provide information to the online system 140 via the client device 110 and the network 120. For example, the interface generator 230 generates a form for a user to provide biographic information, such as the user's age, for inclusion in the user's user profile. When other users request a user's profile page, the interface generator 230 retrieves data from the profile store 205 and generates a representation of the information in the user profile for presentation by the client device 110.

One or more advertisement requests ("ad requests") are stored in the ad request store 235. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the online system 140 if the advertisement is presented to a user or accessed by a user. In one embodiment, the bid amount is used by the online system to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement. In some embodiments, a bid amount associated with an advertiser may be specified as a percentage of an expected revenue to the advertiser of a conversion event associated with the advertisement. Hence, in these embodiments, the bid amount is determined based on the expected revenue to the advertiser based on the percentage identified in an ad request.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The ad action prediction module 240 determines an ad action associated with an advertisement request that indicates a predicted amount of interaction between an online system user and an object associated with advertisement content from the advertisement request. For example, an ad action associated with an advertisement request indicates whether a user presented with advertisement content associated with an online retailer is likely to make a purchase from the online retailer and also indicates an amount of money the user is likely to spend at the online retailer. The ad action may be expressed relative to a threshold value to indicate if the user has a threshold likelihood of performing a minimum number of actions with an object associated with advertisement content. For example, the ad action indicates whether a user is likely to access a clothing website identified by an advertisement at least 5 times. Alternatively, the ad action may be expressed as a specific numerical value indicating a number of interactions between the user and an object associated with advertisement content (e.g., an amount of money spent, a number of interactions, an access time, etc.). For example, an ad action indicates a user is likely to incur $133 in finance charges for a credit card described by an advertisement.

An ad action associated with presentation of an advertisement to a user may also be used as targeting criteria for the advertisement. For example, targeting criteria associated with an advertisement specifies a threshold amount of interaction with an object associated with an advertisement, and the online system presents the advertisement to users to which presentation of the advertisement results in an ad action satisfying the threshold amount of interaction. Identifying and targeting users for receiving an advertisement is further described in U.S. patent application Ser. No. 12/980, 176, filed on Dec. 28, 2010, which is hereby incorporated by reference in its entirety.

In one embodiment, the ad action prediction module 240 also calculates a confidence interval for the ad action associated with an advertisement request. The confidence interval provides a measure of the reliability of the ad action determined for an advertisement request. An ad action expressed relative to a threshold value may also indicate the confidence interval of the ad action. For example, if the ad action for presenting an advertisement to a user is expressed relative to a threshold of spending more than $10 in an application associated with the advertisement, the ad action prediction module 240 also indicates that there is at least a 75% reliability of the user spending more than $10 in the application. If an ad action is expressed as a numerical value, the ad action prediction module 240 indicates multiple ad actions based on based on different confidence intervals. For example, the ad action prediction module 240 indicates that a user will reach between level 3 and level 10 of a game application with a 97% confidence interval and that the user will reach level 5 with a 50% confidence interval. Machine-learning algorithms may be used to determine the ad action associated with an advertisement request and the confidence interval of the ad action.

The web server 245 links the online system 140 via the network 120 to the one or more client devices 110, as well as to the one or more third party systems 130. The web server 245 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or RIM®.

Ranking Advertisements for Presentation Based on Ad Action

Figure 3:
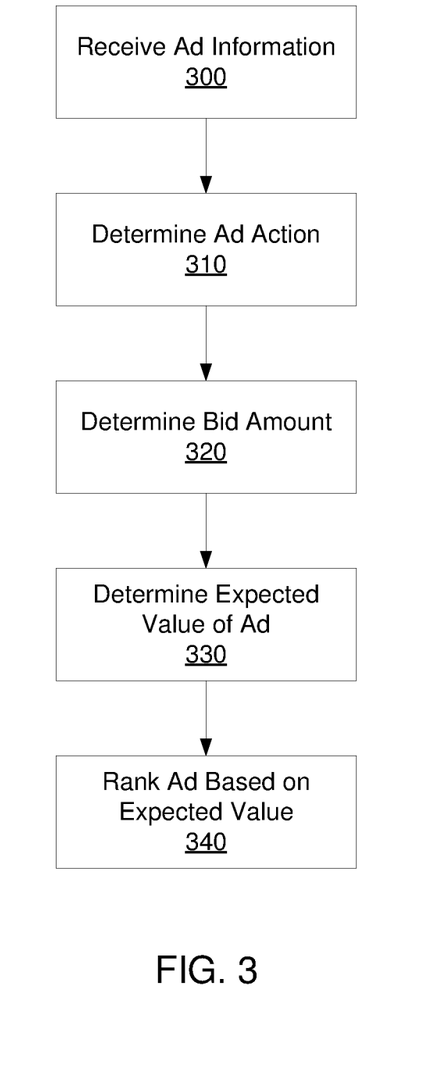
FIG. 3 is a flow chart of a method for selecting an advertisement for presentation based in part on a predicted amount of user interaction with an object associated with the advertisement, in accordance with an embodiment of the invention.

FIG. 3 is a flow chart of one embodiment of a method for selecting an advertisement for presentation to an online system user based on a predicted amount of user interaction with an object associated with the advertisement. The online system 140 receives 300 information describing an advertisement from an advertiser or other suitable source. For example, the online system 140 receives 300 an ad request including an advertisement, a bid amount, targeting criteria, a budget, display times for the advertisement, or any other suitable information. The information describing the advertisement also includes a threshold amount of interaction with an object associated with the advertisement. For example, a received advertisement request specifies an advertisement and an amount of interaction with an object associated with the advertisement. For example, in formation describing an advertisement includes an amount of money spent by a user using an object associated with the advertisement, a number of times a user accesses an object associated with the advertisement, or any other suitable interactions with an object associated with the advertisement. Received information describing an advertisement may also specify a return on investment to an advertiser for presenting the advertisement via the online system 140.

The online system 140 stores the information describing the advertisement. For example, the received information is stored in the ad request store 235. When an opportunity to present the advertisement to a user of the online system is identified, the online system 140 determines 310 an ad action associated with presentation of the advertisement to the user. For example, when a request to present an advertisement to a user is received from a client device, the online system 140 determines 310 an ad action associated with presentation of the advertisement to the user. As described above in conjunction with FIG. 2, the ad action is based on a likelihood that the user will perform an initial interaction with an advertisement and a likelihood of additional interactions with an object associated with the advertisement given the initial interaction. For example, an ad action for presenting an advertisement associated with a flight simulator game application to a user is determined 310 by multiplying the likelihood that the user installs the application by an amount of money the user is expected to spend in the application if installed it.

To determine 310 the ad action for presentation of the advertisement to the user, the online system 140 retrieves data describing interactions previously performed by the user. For example, actions in the action log 220 associated with the user are retrieved and analyzed along with information describing the advertisement or with information describing an object associated with the advertisement to determine a likelihood of the user performing one or more interactions with an object associated with the advertisement. From the determined likelihood, an amount of interaction with the object associated with the advertisement is determined and specifies the ad action for presentation of the advertisement to the user.

For example, a likelihood that the user installs an application associated with an advertisement is based on one or more of: a number of applications with one or more similar characteristics the user has previously installed, correlations between user profile information of the user and user profile information of other users who previously installed the application, a number of other users connected to the user who have installed the application, etc. As an example, the likelihood of a user installing an application associated with an advertisement is higher if the user has installed 8 other applications with a similar characteristic and 5 additional users connected to the user connected have installed the application. Similar information about historical interactions by the user may be used to determine the likelihood of the user performing other interactions if presented with an advertisement.

After determining the likelihood of the user initially interacting with an advertisement, the online system 140 uses the retrieved describing interactions previously performed by the user to determine the likelihood of the user interacting with the object. From the likelihood of the user interacting with the object, the online system 140 determines a predicted amount of interaction with the object. A user's historical interactions with objects (e.g., purchases from online retailers, achievements in a gaming application, number of times accessing content, etc.) may be tracked by loading a tracking mechanism when an interaction by a user with an object identified by an advertisement occurs. For example, a tracking pixel for an advertisement is loaded when a user spends at least a threshold amount of money on a website associated with the advertisement. Alternatively, tracked information about historical actions performed by a user in connection with an advertisement or objects associated with an advertisement may be provided to the online system 140 by the advertiser. Tracked information about historical actions performed by a user may be stored in the action log 220 and accessed by to determine 310 ad action for presentation of an advertisement. For example, to determine an amount of money a user is expected to spend in an application if the application is installed after presentation of an advertisement associated with the application, the online system 140 retrieves prior interactions by the user associated with other applications having one or more similar characteristics or other suitable information. As an example, if a user has previously spent $30 to $50 in applications with a similar characteristic to an advertised application, the online system 140 predicts the user will spend $40 if the advertised application is installed. Hence, the predicted amount of interaction with the object associated with the advertisement is the determined ad action for presenting the advertisement to the user.

In one embodiment, the online system 140 determines 320 a bid amount associated with the advertisement based on the received information describing the advertisement. For example, the online system 140 retrieves a bid amount from an ad request including the advertisement. Alternatively, the information describing the advertisement specifies a return on investment for an advertiser from presentation of the advertisement and pricing information (e.g., a campaign budget). For example, if an advertiser specifies a return on investment of at least 100% and the online system 140 determines that a user is likely to view a page associated with an advertisement 5 times, and the advertiser values each interaction at $1—for a total of $5, the online system 140 determines 320 a bid amount of $2.50 from the determined number of interactions and the return on investment ensuring that the ROI is at least 100% (in this case 150%). The bid amount is limited by pricing information associated with the advertisement, such as a campaign budget for presentation of the advertisement. The bid amount may be adjusted by a confidence interval associated with the determined ad action for presentation of the advertisement to the user. In the previous example, if the online system 140 determines the user will view the page associated with the advertisement between 1 and 10 times with a 95% confidence interval and determines the user will view the page associated with the advertisement 5 times with a 50% confidence interval that the user will view the page 5 times, the determined bid amount may be adjusted by a confidence interval. For example, the initial determined bid amount is multiplied by the confidence interval, so an initial bid amount of $2.50 based on the user viewing the page 5 times is multiplied by 50% (i.e., 0.5) to determine 320 a bid amount of $1.25. Adjusting bid amounts is further described in U.S. patent application Ser. No. 12/611,874, filed on Nov. 3, 2009, which is hereby incorporated by reference in its entirety. In some embodiments, the bid amount may determined based on a percent of expected revenue from a conversion event. For example, an advertiser may determine that it makes 10% from each advertised product or service that is purchased, so the advertiser specifies a bid amount of 10% of a conversion event instead of specifying a dollar value. In this example, if the expected revenue of a conversion from presentation of an advertisement is $50, the bid amount used for the advertisement when selecting advertisements is set at $5 (i.e., 10% of the expected value of the conversion).

Based on the ad action, an expected value of the advertisement is determined 330 and used to select an advertisement for presentation to the user. In one embodiment, the expected value of the advertisement is an expected revenue based at least part on predicted amount of interaction with the object. An advertiser associated with the advertisement includes an amount of revenue associated with each interaction with the object associated with the advertisement, and the expected revenue is determined 330 based on the per-interaction amount of revenue and the predicted amount of interaction with the object.

A plurality of advertisements are ranked 340 based on their associated expected values and one or more advertisements for presentation to the user are selected based at least in part on the ranking. In some embodiments, an advertisement's expected value may be based on additional information, such as a bid amount associated with the advertisement, targeting criteria associated with the advertisement, or other suitable information. In various embodiments, candidate advertisements having at least one targeting criteria satisfied by information associated with the user are identified and ranked 340 according to their associated expected value. An advertisement's location in the ranking indicates a likelihood that the advertisement is presented to the user. Advertisements associated with higher expected values may have a higher position in the ranking, making them more likely to be presented to the user. As described above in conjunction with FIG. 2, targeting criteria associated with an advertisement may specify a threshold amount of interaction with an object associated with the advertisement, so an ad action for presentation of the advertisement to a user affects whether the user satisfies the threshold amount of interaction in the targeting as well as the expected value of presenting the advertisement to the user. Hence, the ad action for presentation of an advertisement to a user may affect whether the user is eligible to be presented with the advertisement based on targeting criteria specifying an amount of interaction with an object associated with the advertisement as well as the expected value of presenting the advertisement.

Figure 4:
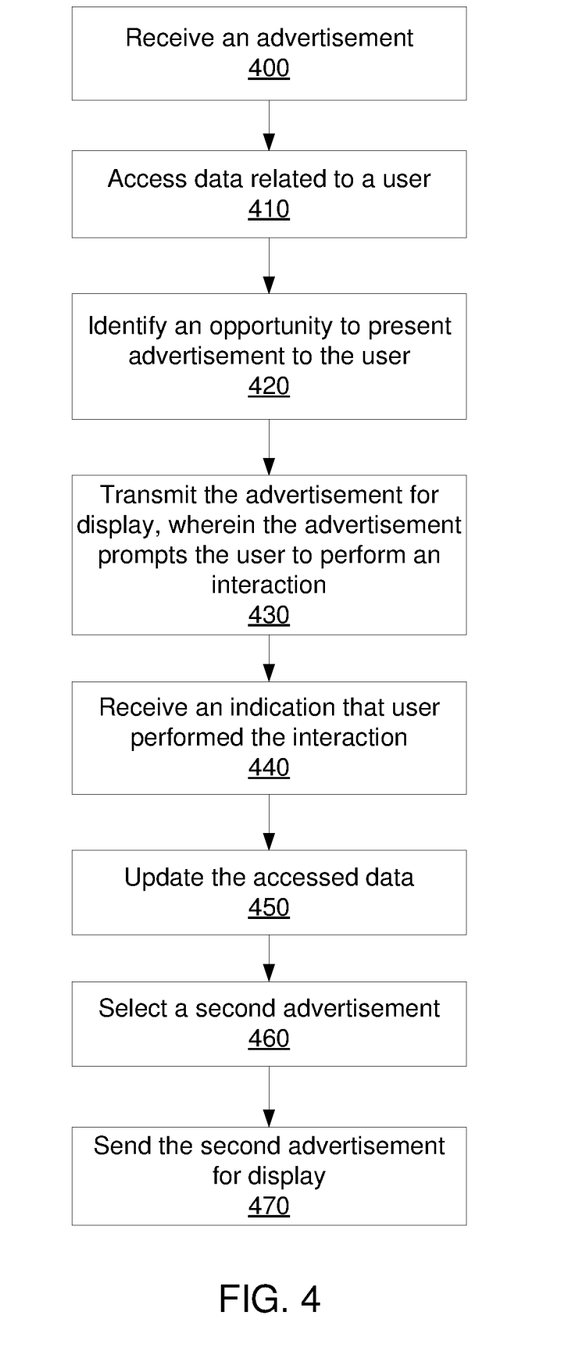
FIG. 4 is a flowchart of a method for selecting an advertisement for presentation to an online system user in accordance with an embodiment of the invention.

FIG. 4 is a flowchart of another embodiment of a method for selecting an advertisement for presentation to an online system user, according to an embodiment. The online system 140 receives 400, at an online system from an advertisement provider, an advertisement for an application that executes on a client device 110 associated with a user. The advertisement displays a prompt to the user, and the application is separately downloaded to the client device 110 from a third party application provider. The third party application provider is able to communicate with the online system 140. The online system 140 accesses 410 data related to the user, and the data is stored at the online system. The online system 140 identifies 420, based on the accessed data related to the user, an opportunity to present the advertisement to the user via the client device 110. The online system 140 transmits 430, to the client device 110, the advertisement for display to the user such that the advertisement, upon display to the user, prompts the user to perform an interaction.

The online system 140 receives 440, via a call from an application programming interface computer program code executing on the client device 110, an indication that the user performed the interaction while using the application. The indication is generated by loading a tracking mechanism when the interaction occurs, and the interaction occurs subsequent to an initial interaction with the advertisement. The online system 140 updates 450, based on received indication, the accessed data related to the user to indicate that the user performed the interaction while using the application. The online system 140 selects 460, based on the accessed data, a second advertisement. The second advertisement displays a second prompt to the user, and the second prompt prompts the user to perform a second interaction. The online system 140 sends 470 the second advertisement with the second prompt for display to the user via the client device.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online system from an advertisement provider, an advertisement for an application that executes on a client device associated with a user, the advertisement displaying a prompt to the user, the application separately downloaded to the client device from a third party application provider, the third party application provider able to communicate with the online system, the third party application provider different from the online system;
accessing data related to the user, the accessed data being stored at the online system;
identifying, based on the accessed data related to the user, an opportunity to present the advertisement to the user via the client device;
transmitting, to the client device, the advertisement for display to the user, wherein the transmitting causes the advertisement to be displayed to the user and the advertisement, upon display to the user, prompts the user to perform an interaction;
calling an application programming interface programming code executing on the client device to receive data describing the user's interactions with the advertisement:
receiving, via a call from the application programming interface computer program code executing on the client device, an indication that the user performed the interaction while using the application, the indication generated by loading a tracking mechanism when the interaction occurs, the interaction occurring subsequent to an initial interaction with the advertisement;
updating, based on the received indication, the accessed data related to the user to indicate that the user performed the interaction while using the application;
determining a second advertisement, the second advertisement displaying a second prompt to the user, wherein the second prompt prompts the user to perform a second interaction, wherein the advertisement is tailored for the user based on the accessed data; and
sending the second advertisement with the second prompt for display to the user via the client device.

2. The method of claim 1, wherein the client device is a mobile device.

3. The method of claim 1, wherein the accessed data further includes data related to one or more previously performed user interactions within at least one application.

4. The method of claim 3, wherein the identifying the opportunity to present the advertisement further comprises:
ranking the advertisement with a plurality of other advertisements, the ranking based at least in part on data related to a particular previously performed user interaction of the one or more previously performed user interactions within at least one application; and
identifying the advertisement for display to the user based at least in part on the ranking.

5. The method of claim 4, wherein the particular previously performed user interaction is spending an amount of money interacting within the at least one application.

6. The method of claim 4, wherein the particular previously performed user interaction is spending an amount of time interacting within the at least one application.

7. The method of claim 4, wherein the particular previously performed user interaction is accessing the at least one application a number of times.

8. The method of claim 4, wherein the particular previously performed user interaction is purchasing one or more products via the at least one application.

9. The method of claim 4, wherein the particular previously performed user interaction is attending one or more events associated with the at least one application.

10. The method of claim 4, wherein the particular previously performed user interaction is achieving a status in the at least one application, as determined by the at least one application.

11. The method of claim 4, further comprising:
determining a predicted amount of user interaction within the application based at least in part on the accessed data;
determining an expected revenue from the predicted amount of user interaction within the application, and
wherein ranking the advertisement with the plurality of other advertisements is further based in part on the predicted amount of user interaction within the application and the expected revenue from a likelihood of one or more user interactions within the application.

12. The method of claim 11, wherein the expected revenue from the predicted amount of user interaction within the application is further based on one or more targeting criterions associated with the advertisement and identifying one or more characteristics of users of the online system eligible to be presented with the advertisement.

13. The method of claim 12, wherein the one or more targeting criterion are selected from a group consisting of: an expected value of presenting the advertisement to the user, descriptive information associated with the user and included in a user profile maintained by the online system, actions performed by the user on the online system, actions performed by the user on one or more systems external to the online system, information associated with one or more users of the online system connected to the user, a geographic location associated with the user, device parameters for the client device, and any combination thereof.

14. The method of claim 3, further comprising:
applying a targeting criterion to determine whether the user is eligible to receive the advertisement, the targeting criterion based at least in part on the data related to user interactions within the at least one application;
wherein transmitting, to the client device, the advertisement for display to the user comprises transmitting, to the client device, the advertisement for display to the user subject to satisfaction of the targeting criterion.

15. The method of claim 14, wherein the targeting criteria is based on one or more selected from a group consisting of: the expected value of presenting the advertisement to the user, descriptive information associated with the user and included in a user profile maintained by the online system, actions performed by the user on the online system, actions performed by the user on one or more systems external to the online system, information associated with one or more users of the online system connected to the user, a geographic location associated with the user, device parameters for the client device, and any combination thereof.

16. The method of claim 1, wherein the accessed data is selected from a group consisting of: information from a user profile associated with the user, actions performed by the user on the online system, actions performed by the user on one or more third-party systems, actions performed by one or more users of the online system connected to the user, information from one or more user profiles associated with one or more users connected to the user, a geographic location associated with the user, and any combination thereof.

17. The method of claim 1, further comprising loading a tracking mechanism associated with the advertisement if the user performs an interaction within the application after display of the advertisement.

18. The method of claim 1, wherein identifying, based on the accessed data related to the user, an opportunity to present the advertisement to the user via the client device further comprises:
receiving a request from the client device for the opportunity to present the advertisement; and
selecting the advertisement for presentation from a plurality of candidate advertisements, the selection performed by:
selecting the plurality of candidate advertisements from a plurality of advertisements, wherein the accessed data related to the user indicates information that satisfies targeting criteria of the plurality of candidate advertisements, each candidate advertisement prompting a user interaction within one of a plurality of applications, the plurality of candidate advertisements including the advertisement;
for each of the plurality of candidate advertisements, computing an ad action indicating a likelihood value of the user performing an interaction with the candidate advertisement combined with a likelihood value of the user performing an interaction within one of a plurality of applications as prompted by the candidate advertisement, the likelihood value of the user performing the interaction within the one of the plurality of applications computed according to a number of prior interactions within applications having a threshold measure of similarity to the interaction prompted by the candidate advertisement;
for each of the plurality of candidate advertisements, computing an expected value for the candidate advertisement, the expected value computed by a combination of a bid amount for the candidate advertisement and an associated ad action for the candidate advertisement;
ranking the plurality of candidate advertisements by expected value; and selecting the advertisement from the ranked plurality of candidate advertisements, the advertisement having a highest expected value of the ranked plurality of candidate advertisements.

19. A computer program product comprising a computer-readable storage medium having instructions encoded thereon that, when executed by a processor, cause the processor to:
receive, at an online system from an advertisement provider, an advertisement for an application that executes on a client device associated with a user, the advertisement displaying a prompt to the user, the application separately downloaded to the client device from a third party application provider, the third party application provider able to communicate with the online system, the third party application provider different from the online system;
access data related to the user, the accessed data being stored at the online system;
identify, based on the accessed data related to the user, an opportunity to present the advertisement to the user via the client device;
transmit, to the client device, the advertisement for display to the user, wherein the transmitting causes the advertisement to be displayed to the user and the advertisement, upon display to the user, prompts the user to perform an interaction;
call an application programming interface programming code executing on the client device to receive data describing the user's interactions with the advertisement:
receive, via a call from the application programming interface computer program code executing on the client device, an indication that the user performed the interaction while using the application, the indication generated by loading a tracking mechanism when the interaction occurs, the interaction occurring subsequent to an initial interaction with the advertisement;
update, based on the received indication, the accessed data related to the user to indicate that the user performed the interaction while using the application;
determine a second advertisement, the second advertisement displaying a second prompt to the user, wherein the second prompt prompts the user to perform a second interaction, wherein the advertisement is tailored for the user based on the accessed data; and
send the second advertisement with the second prompt for display to the user via the client device.

20. A system comprising:
a client device; and
an online system coupled to the client device via a network, the online system comprising:
a memory storing executable instructions; and
a processor configured to execute the executable instructions, the executable instructions, when executed, cause the processor to:
receive, at an online system from an advertisement provider, an advertisement for an application that executes on a client device associated with a user, the advertisement displaying a prompt to the user, the application separately downloaded to the client device from a third party application provider, the third party application provider able to communicate with the online system, the third party application provider different from the online system;
access data related to the user, the accessed data being stored at the online system;
identify, based on the accessed data related to the user, an opportunity to present the advertisement to the user via the client device;
transmit, to the client device, the advertisement for display to the user, wherein the transmitting causes the advertisement to be displayed to the user and the advertisement, upon display to the user, prompts the user to perform an interaction;
call an application programming interface programming code executing on the client device to receive data describing the user's interactions with the advertisement;
receive, via a call from the application programming interface computer program code executing on the client device, an indication that the user performed the interaction while using the application, the indication generated by loading a tracking mechanism when the interaction occurs, the interaction occurring subsequent to an initial interaction with the advertisement;
update, based on the received indication, the accessed data related to the user to indicate that the user performed the interaction while using the application;
determine a second advertisement, the second advertisement displaying a second prompt to the user, wherein the second prompt prompts the user to perform a second interaction, wherein the advertisement is tailored for the user based on the accessed data; and
send the second advertisement with the second prompt for display to the user via the client device.

* * * * *